United States Patent Office 3,149,947
Patented Sept. 22, 1964

3,149,947
METHOD OF MAKING CRYSTALLINE MICA
BODIES AND PRODUCT
Richard A. Eppler, Corning, John F. MacDowell, Painted Post, and John D. Stetler, Addison, N.Y., assignors to Corning Glass Works, Corning, N.Y., a corporation of New York
No Drawing. Filed Mar. 19, 1962, Ser. No. 180,878
8 Claims. (Cl. 65—33)

This invention relates to the manufacture of synthetic mica. More particularly, this invention relates to the manufacture of synthetic fluorophlogopite.

The natural minerals called "micas" possess several unique properties which make them commercially important. Two of the most significant of these are machineability and outstandingly high dielectric properties. Attempts at the synthesis of mica can be discovered dating back almost a centrury. Increased interest has been apparent during the intermittent national emergencies when the supply of the natural product from India has been threatened.

Micas can be divided into three principal species, neglecting variations due to atomic substitution. Muscovite, having the general formula $KAl_2(AlSi_3)O_{10}(OH)_2$, is the most common commercial natural mica, accounting for 60–70% of the industrial market. Although muscovite has been synthesized by a sintering-type reaction, for the most part this mineral has resisted synthesis and, consequently, synthetic muscovite has not been developed commercially. Lepidolite, having the general formula $K(Li_2Al)Si_4O_{10}(OH)_2$, is a commercial mineral but not as a source of crystalline mica. Rather, it is used as an ore for the production of lithium. Phlogopite, having the general formula $KMg_3(AlSi_3)O_{10}(OH, F)_2$, and biotite, $K(Mg, Fe)_3(Al, Fe)Si_3O_{10}(OH, F)_2$, are arbitrary divisions of a single phase of variable composition, phlogopite being the pale colored, low-iron part of the series. Since iron is generally deleterious to the properties desired, particularly the dielectric character, phlogopite is the commercially important end member.

The considerable research which has been done has shown that phlogopite can be readily synthesized from a liquid melt. However, because it has proved difficult to introduce hydroxyl groups into a crystalline structure produced by the fusion of inorganic materials at high temperatures, phlogopite micas have been synthesized in which the hydroxyl group is replaced by fluorine. Such products are known as fluorophlogopites.

To be of practical utility, the mica must be manufactured in the form of large sheets or shaped bodies. Many processes have been conceived to accomplish this result. Most of these have been based upon the theoretical consideration that by very slowly cooling the fluorophlogopite from a liquid state through its freezing point (generally requiring several days), crystals will form and grow to useful dimensions. However, these techniques have not resulted in the manufacture of crystalline products which are usable without additional processing. Such additional processes usually comprise mixing the mica flake with a binder and then forming such mixture into bodies of the desired configuration under pressure and/or elevated temperature.

We are also familiar with the method of producing synthetic fluorophlogopite as described in the pending application of Klingsberg, Serial No. 53,863, wherein a glass of fluorophlogopite composition is given a critical heat treatment in order to produce a semicrystalline body. This method gives bodies which possess good machineability and electrical properties, but are difficult to cast in such a way as to prevent large surface splotches due to the growth of large single crystals and to prevent an overly glassy matrix on the surface, both of these features leading to a weak, easily fractured material.

The principal object of our invention is to provide a method for the rapid production of bodies of fluorophogopite which is relatively simple in operation, which is economical in practice, and which yields bodies that are sound in structure throughout.

Another boject of our invention is to produce articles of synthetic fluorophlogopite which have clean surfaces, which exhibit outstandingly high dielectric properties, and which can be machined easily to a desired shape.

A still further object is to produce bodies of synthetic fluorophlogopite wherein apparatus and techniques known to the art can be used, thus requiring only a minimum of experience and training before large scale production can be initiated.

We have discovered that crystalline bodies of synthetic mica having excellent electrical and machining properties can be produced by melting a batch containing the constituents of a fluorophlogopite mica phase in such proportion as to be stoichiometrically equivalent to at least about 90% by weight of the fluorophlogopite phase and about 0.2 to 10.0% by weight of chromium oxide, simultaneously forming the molten batch into the desired shape and rapidly chilling said shape to form a glass surface layer thereon, but retaining the interior in the molten shape, and thereafter immediately annealing said shape. Our process comprises melting the batch in crucibles, pots, or tanks, depending upon the size of the melt desired, pouring the melt into a mold and holding it therein for a sufficient period to surface chill the material below its softening point producing a glass surface layer (usually about 10–30 seconds), and then removing the body from the mold and then placing it in an annealer maintained at a temeprature below the softening point of the composition but above the annealing point; preferably a temperature of about 600° C. Our invention, then, is not predicated upon the growth of crystals by cooling a liquid melt very slowly nor in a critical heat treatment of a glass in order to produce a semicrystalline body. Rather, it is based upon a fast casting technique.

The invention, in essence, is the result of our discovery that where batches comprising the approximate stoichiometic composition of fluorophlogopite, but containing a minor amount of chromium oxide as a nucleating agent, are melted, a dense crystalline body can be obtained through direct casting.

The following theory has been proposed which, though we do not wish to be bound by it, we believe best explains the functions of our cooling practice. The high conductivity of the mold causes an initial surface chill of the material to the glassy state while the interior remains fluid. At the interface between these two zones, the chromium oxide serves to produce a uniform, fine-grained nucleation on the inside of the surface layer. When the mold is removed, the surface resistance to heat transfer becomes high and, as a result, the surface layer reheats and crystallizes. Here again, the chromium oxide serves to initiate a smooth, fine-grained crystallization. In the meantime, the body is cooling slowly in the annealer, with the thermal gradient perpendicular to the surface. This causes the body to crystallize in an oriented manner, the crystals growing preferentially in the direction of the thermal gradient.

We have found that the machinability property places very stringent limitations on possible composition variations. The compositions must be held close enough to a 100% fluorophlogopite mica to eliminate residual glass which has a severely adverse effect upon this property. More specifically, only a 10 weight percent variation from the theoretical phlogopite composition can be tolerated, i.e., the combination of components in the batch must be so balanced to be stoichiometrically equivalent to 90 percent by weight of fluorophlogopite. The remaining 10 weight percent of the composition consists of chrome oxide in the required proportion and may comprise excessive amounts of one or more, and less than all, of the constituents of the fluorophlogopite, glass modifying oxides, and/or extraneous impurities.

However, isomorphous substitution in the phlogopite structure has long been known to be quite extensive. For a good description of isomorphism in phlogopite, see Shell, H. R., Effect of Isomorphic Substitutions on Properties of Fluormica Ceramics, Bureau of Mines Rept. Inv., 5667, 1960. In summarizing the chemical requirements for substitution, a general formula for phlogopite isomorphs can be written:

$$X_{.5-1}Y_3Z_4O_{10}F_2$$

In this formula, X is generally potassium but it can be any of the large ($r>1.00$) singly or doubly charged positive ions, e.g., sodium, silver, and calcium. Y represents a number of moderate sized ($.60<r<.90$) doubly or more highly charged positive ions, e.g., $Cu^{2+}$, $Sn^{4+}$, $Ti^{4+}$, $Zr^{4+}$, $Co^{2+}$, $Ni^{2+}$, $Mn^{4+}$, and $Zn^{2+}$, although, of course, magnesium is generally present either alone or in combination with these other ions. Z is a small ($r<.60$) highly charged positive ion. In most instances, it is silicon and aluminum in a mole ratio of 3:1 but boron may also be utilized in this position.

It will be understood, then, that the stringent limitations on composition variations mentioned above do not refer to isomorphism but to variances of amounts of ingredients outside the theoretical composition of fluorophlogopite and/or its isomorphs. Thus, our invention is applicable to compositions delineated by the general formula for phlogopite isomorphs.

In the examples listed in Tables I and II, batches which upon melting produce the theoretical composition of fluorophlogopite, but containing 0.48%, 1.92%, or 3.84% by weight of chromium oxide, were melted at about 1450° C. for about 6 hours. The batches, in addition, contain about 0.6% by weight excess fluorine as prior work had shown that about this amount of fluorine was lost during melting so this additional amount was incorporated into the batch enabling the crystallized body to have the proper stoichiometric quantity. The amount of fluorine lost depends upon such factors as melting time and temperature, batch materials utilized, and the composition of the resulting melt. The batches were dry ball milled prior to melting to aid homogeneity. After melting, the fluid was poured into a 5″ x 5″ x 1″ steel mold preheated to about 150° C., and a steel plunger or cover placed in contact with the top surface of the melt for 30 seconds. The shapes were then removed from the mold, placed in an annealer set at 600° C., and annealed for about 0.5 hour. The batch components set forth in Table I are stated in parts by weight. It will be realized, of course, that the batches may be comprised of any materials, either oxides or other compounds, which, on being fused together to form a melt, are converted to the desired oxide compositions in the desired proportions. Table II sets out the compositions of the examples calculated from their respective batches to the oxide basis in weight percent exclusive of impurities which may be present in the batch materials.

In the following compositions, as in all siliceous compositions containing fluorine, it is not known with what cation or cations the fluorine is combined. In accordance with conventional analytical practice, the fluorine is here computed as F and the total percentage of the various constituents is greater than 100. In order to arrive at a total of 100%, it is customary to deduct the oxygen equivalent of fluorine, known to analysts as the percentage of fluorine divided by the combining weight of fluorine 19, and multiplied by the combining weight of oxygen, 8, or in brief, the percentage of fluorine multiplied by the factor 0.421.

*Table I*

|  | 1 | 2 | 3 |
|---|---|---|---|
| Potassium silicofluoride | 187.9 | 187.9 | 187.9 |
| Magnesia | 286.9 | 286.9 | 286.9 |
| Calcined alumina | 120.9 | 120.9 | 120.9 |
| Sand | 377.1 | 377.1 | 377.1 |
| Potassium carbonate | 33.0 | 33.0 | 33.0 |
| Potassium nitrate | 21.5 | 21.5 | 21.5 |
| Ammonium dichromate | 6.1 | 24.4 | 48.8 |

*Table II*

|  | 1 | 2 | 3 |
|---|---|---|---|
| $K_2O$ | 11.01 | 10.94 | 10.72 |
| $MgO$ | 28.45 | 28.03 | 27.45 |
| $Al_2O_3$ | 11.99 | 11.81 | 11.57 |
| $SiO_2$ | 42.39 | 41.78 | 40.94 |
| F | 9.79 | 9.60 | 9.41 |
| $Cr_2O_3$ | 0.48 | 1.92 | 3.84 |

An X-ray diffraction study was carried out on each material to determine the crystal phase present, a powder diffraction pattern being compared with a single crystal standard of fluorophlogopite. The differences were very small and were attributed to the presence of the chromium impurity.

The materials were fully machineable, using ordinary hand tools. They could be sawed with ease with an ordinary hack saw and could be drilled, giving a clean hole, with a common high-speed drill. This latter feature is remarkable because, generally speaking, high-speed drills cannot be used with ceramic materials, holes being drilled carefully and at slow speeds.

Modulus of rupture measurements averaged somewhat over 2200 p.s.i. which is outstanding when compared with the synthetic mica bodies of commerce.

The coefficients of expansion for the range 0°–300° C. averaged 85 to $90 \times 10^{-7}$/° C.

The shapes were sawed into two pieces to observe the interior structure. A thin surface layer containing some residual green glass was present. The mica crystals were intertwined white sheets grown from the surface layer inward. Crystal packing was sufficiently dense that intercrystal voids were not visible to the unaided eye. There were no casting voids nor surface splotches apparent in any of the samples.

This thin glassy surface layer does not have a serious adverse effect on the machinability of our material and has the advantage of augmenting the strength of the shapes. The layer can be removed mechanically by grinding it off or its presence may be rendered substantially non-existent by pouring the melt into refractory molds instead of steel or by pouring into molds (refractory or metal) which have been heated to a temperature above the softening point of the melt. This modification sufficiently retards the chilling step such that the glassy surface layer formed is so thin it becomes substantially crystalline during the crystallization of the body portion.

The materials had excellent electrical properties, the dielectric constants measured at 25° C. and 1 mc./s.

averaged about 7 and the logarithm of the D.C. volume resistivity averaged about 10.0 at 350° C. and 11.6 at 250° C. The materials were stable at a temperature of 1100° C. and over.

As was noted previously, isomorphous substitution in the phlogopite structure is quite extensive. The following examples were compounded utilizing about 2 weight percent $Cr_2O_3$ and formed in the same manner as described in the prior examples but with substitutions in the "X," "Y," and "Z" sites. X-ray diffraction studies were conducted to determine the phase stability of the phlogopite structure and the limits of effectiveness for chromium oxide nucleation. By limits of phase stability, we mean the compositional limits which will produce phlogopite mica as the primary crystalline phase, as determined by standard X-ray powder diffraction techniques. By limits of effectiveness of nucleation, we mean the compositional limits which will produce a characteristic morphology, that is, the mica crystals grow perpendicularly from the surface layer inward. In other words, some compositions crystallize as phlogopite but not in the manner characteristic of that produced by chromium oxide nucleation. Such bodies generally do not have the excellent electrical and machining properties of our material. We have found that the range of effectiveness of chromium oxide nucleation is often not as great as the stability range of the phase, but it is still appreciable.

The first group studied was the substitution of alkaline earths for potassium in the "X" sites in the molar ratio ½:1. A typical end member would be $$Ba_{1/2}Mg_3AlSi_3O_{10}F_2$$

In this method, one half of the sites were filled with alkaline earth ions while the other half were vacant.

In the case of barium, the phase is stable all the way to full substitution but the chromium oxide nucleation is effective only up to approximately one-half of the total substitution.

In the cases of calcium and strontium, both the phase stability and chromium nucleation effectiveness amount to only about one-half of the total substitution.

Lead is an ion which, while not an alkaline earth, behaves crystal-chemically quite similarly. Therefore, its reaction was also studied. Both the phase stability and the chromium oxide nucleation effectiveness are satisfactory when lead oxide is substituted for up to about ⅔ mole of potassium oxide.

The second group studied involved the substitution of alkaline earths for potassium in the "X" site in the molar ratio 1:1; with charge compensation by means of vacating some of the "Y" sites. A typical end member would be $BaMg_{2.5}AlSi_3O_{10}F_2$.

In the case of barium, the phase is stable, at least in part, all the way to the barium end member. However, the chromium nucleation is effective only up to approximately ½ mole of the substituted potassium.

With strontium and calcium, the phases are stable up to about ⅔ mole while the chromium oxide nucleation is effective only up to less than ⅓ mole. The substitution by lead was also observed again with results substantially similar to those of the strontium and calcium.

Table III summarizes studies conducted in the same manner as those described above to determine limits of isomorphous substitution in the phlogopite mica structure for the fusion cast method of forming which constitutes the basis of our invention. These studies did not include all possible isomorphous substitutions but were confined to those substitutions useful in producing bodies which might have commercial significance. Furthermore, these studies confirmed the effectiveness of the chromium oxide as a nucleator for the fluorophlogopite structure even when isomorphous substitutions have been made.

The values quoted are moles of $K^+$, $Mg^{2+}$, or $Al^{3+}$ in the base composition ($KMg_3AlSi_3O_{10}F_2$) for which the designated ion has been substituted.

*Table III*

A. SUBSTITUTION FOR POTASSIUM IN THE "X" SITES (1 MOLE IS TOTAL SUBSTITUTION)

| Ion Substituted | End Member | Limit of Phlogopite Phase Stability, moles | Limit of Effectiveness of Chromium Oxide Nucleation, moles |
|---|---|---|---|
| $Na^+$ | $NaMg_3AlSi_3O_{10}F_2$ | 1 | 1 |
| $Rb^+$ | $RbMg_3AlSi_3O_{10}F_2$ | 1 | 1 |
| $Ag^+$ | $AgMg_3AlSi_3O_{10}F_2$ | ⅓ | ⅓ |
| $Ca^{2+}$ | $Ca_{½}Mg_3AlSi_3O_{10}F_2$ | ⅔ | ⅓ |
|  | $CaMg_{2.5}AlSi_3O_{10}F_2$ | ⅔ | ⅓ |
| $Sr^{2+}$ | $Sr_{½}Mg_3AlSi_3O_{10}F_2$ | ½ | ½ |
|  | $SrMg_{2.5}AlSi_3O_{10}F_2$ | ⅔ | ⅔ |
| $Ba^{2+}$ | $Ba_{½}Mg_3AlSi_3O_{10}F_2$ | 1 | ½ |
|  | $BaMg_{2.5}AlSi_3O_{10}F_2$ | 1 | ½ |
| $Tl^+$ | $TlMg_3AlSi_3O_{10}F_2$ | ⅔ | ⅔ |
| $Pb^{2+}$ | $Pb_{½}Mg_3AlSi_3O_{10}F_2$ | ⅔ | ⅔ |
|  | $PbMg_{2.5}AlSi_3O_{10}F_2$ | ⅔ | ⅓ |

B. SUBSTITUTION FOR MAGNESIUM IN THE "Y" SITES (3 MOLES IS TOTAL SUBSTITUTION)

| Ion Substituted | End Member | Limit of Phlogopite Phase Stability, moles | Limit of Effectiveness of Chromium Oxide Nucleation, moles |
|---|---|---|---|
| $Cu^{2+}$ | $KCu_3AlSi_3O_{10}F_2$ | 1 | 1 |
| $Zn^{2+}$ | $KZn_3AlSi_3O_{10}F_2$ | 1½ | 1½ |
| $Ti^{4+}$ | $KTi_{1.5}AlSi_3O_{10}F_2$ | ⅔ | ½ |
| $Zr^{4+}$ | $KZr_{1.5}AlSi_3O_{10}F_2$ | ⅔ | ½ |
| $Sn^{4+}$ | $KSn_{1.5}AlSi_3O_{10}F_2$ | ⅔ | ½ |
| $Mo^{6+}$ | $KMoAlSi_3O_{10}F_2$ | 1 | ½ |
| $Mn^{4+}$ | $KMn_{1.5}AlSi_3O_{10}F_2$ | ⅔ | ⅔ |
| $Co^{2+}$ | $KCo_3AlSi_3O_{10}F_2$ | 1 | 1 |
| $Ni^{2+}$ | $KNi_3AlSi_3O_{10}F_2$ | ⅔ | ⅔ |

C. SUBSTITUTION FOR ALUMINUM IN THE "Z" SITES (1 MOLE IS TOTAL SUBSTITUTION)

| Ion Substituted | End Member | Limit of Phlogopite Phase Stability, moles | Limit of Effectiveness of Chromium Oxide Nucleation, moles |
|---|---|---|---|
| $B^{3+}$ | $KMg_3BSi_3O_{10}F_2$ | 1 | ½ |

These data are consistent with the generally accepted rules concerning ionic radii and electronic charge criteria for substitution.

Our invention, then, provides a method for rapidly forming sound bodies of crystalline fluorophlogopite which can be practiced using the apparatus and techniques well-known to the ceramic art. Although the chromium oxide will nucleate compositions wherein there is some variation from the stoichiometric amounts of each ingredient in fluorophlogopite, the physical qualities of the product are much superior when these variances are absent or minimal. The presence of additional or an excess of one of the proper components may lead to the crystallization of an undesirable phase, or at the least, result in a glassy phase which is deleterious to the electrical and machining properties of the body. Thus, variations up to about 10% by weight in the oxide compositions listed in Table III can be tolerated but are not preferred. Likewise, when isomorphous substitutions are made, it is far preferable to maintain the stoichiometric values of the original composition.

Although each of the examples herein was formed by casting the fluid melt in a mold, removing the body from the mold after the rapid chilling step, and placing it in an annealer, it will be understood that other conventional forming methods such as pressing, rolling, or spinning may be employed. Thus, long sheets and large plates of the material as well as shaped articles can be obtained. Likewise, it will be understood that the time of chilling depends upon the size of the body cast, the smaller the body the less chill time required. For small electrical components, as little as ten seconds would be required to cause the surface to set up but leaving the interior still fluid, while for large blocks, as much as 60 seconds and longer have been found practical. Thirty seconds has seemed to be a satisfactory mean. In the examples noted above, each melt was poured into a steel mold which had been preheated to about 150° C. We have estimated that immediately after the chilling step the surface of the body is approximately 300° C. and the interior in the neighborhood of 1300° C. These temperatures are not critical, of course, but are useful in demonstrating the rapid chilling and the extremely broad temperature gradient through the body. The annealing point of these bodies is about 600° C. Somewhat higher annealing temperatures, up to about the softening point, and longer annealing times than 0.5 hour may be used, if desired, but to no particular advantage. Finally, as the liquidus of fluorophlogopite is 1345° C., a melting temperature of about 100° C. higher was selected. Here, again, this temperature is not critical but was chosen to insure a homogeneous melt. Higher temperatures may be used but fluorine volatilization would be even greater.

The mica bodies of this invention have the requisite properties to make them useful for a wide variety of applications such as insulating spacers in electronic tubes, brazing fixtures, decorative wall tile, smoking pipes, and the like.

What is claimed is:

1. The method of producing substantially crystalline bodies of synthetic mica having excellent electrical and machining properties comprising melting a batch containing the constituents of a fluorophlogopite mica phase having the general formula $X_{0.5-1}Y_3Z_4O_{10}F_2$, wherein X is at least one singly or doubly charged positive ion having an ionic radius greater than 1.0 selected from the group consisting of $Na^+$, $K^+$, $Rb^+$, $Ag^+$, $Ca^{2+}$, $Sr^{2+}$, $Ba^{2+}$, $Tl^{2+}$, and $Pb^{2+}$, Y is at least one doubly or more highly charged positive ion having an ionic radius between 0.60 and 0.90 selected from the group consisting of $Mg^{2+}$, $Cu^{2+}$, $Zn^{2+}$, $Ti^{4+}$, $Zr^{4+}$, $Sn^{4+}$, $Mo^{6+}$, $Mn^{4+}$, $Co^{2+}$, and $Ni^{2+}$, and Z represents a combination of silicon and a highly charged positive ion having an ionic radius less than 0.6 selected from the group consisting of $Al^{3+}$ and $B^{3+}$ in a mole ratio of 3:1, said constituents being present in such proportion that said melt is stoichiometrically equivalent to at least about 90% by weight of said fluorophlogopite phase, and as nucleating agent about 0.2–10% by weight of chromium oxide, passing the molten batch to forming means, the surface of which is heat-conductive, so as to simultaneously form the molten batch into the desired shape and rapidly chill the surface of said shape to a temperature at least below the softening point of the melt, maintaining thereat for about 10 to 60 seconds to develop a glass surface layer thereon but retaining the interior in the molten state, and thereafter immediately removing said shape from the forming means and annealing said shape to cause fluorophlogopite mica crystals to grow perpendicularly from the surface layer inward.

2. The method according to claim 1 wherein the chromium oxide content is about 2.0% by weight.

3. The method of producing substantially crystalline bodies of synthetic fluorophlogopite mica having excellent electrical and machining properties comprising melting a batch containing the constituents of fluorophlogopite mica having the formula $KMg_3AlSi_3O_{10}F_2$, said constituents being present in such proportion that said melt is stoichiometrically equivalent to about 90% by weight of said fluorophlogopite, and as nucleating agent about 0.2–10% by weight of chromium oxide, passing the molten batch to forming means, the surface of which is heat-conductive, so as to simultaneously form the molten batch into the desired shape and rapidly chill the surface of said shape to a temperature at least below the softening point of the melt, maintaining thereat for about 10 to 60 seconds to develop a glass surface layer thereon but retaining the interior in the molten state, and thereafter immediately removing said shape from the forming means and annealing said shape to cause fluorophlogopite mica crystals to grow perpendicularly from the surface layer inward.

4. The method according to claim 3 wherein the chromium oxide content is about 2.0% by weight.

5. The method according to claim 3 wherein at least one singly or doubly charged positive ion having an ionic radius greater than 1.0, selected from the group consisting of $Na^+$, $Rb^+$, $Ag^+$, $Ca^{2+}$, $Sr^{2+}$, $Ba^{2+}$, $Tl^{2+}$, and $Pb^{2+}$, is substituted isomorphously for the potassium in the fluorophlogopite structure.

6. The method according to claim 3 wherein at least one doubly or more highly charged positive ion having an ionic radius between 0.60 and 0.90, selected from the group consisting of $Cu^{2+}$, $Zn^{2+}$, $Ti^{4+}$, $Zr^{4+}$, $Sn^{4+}$, $Mo^{6+}$, $Mn^{4+}$, $Co^{2+}$, $Ni^{2+}$, is substituted isomorphously for the magnesium in the fluorophlogopite structure.

7. The method according to claim 3 wherein boron is substituted isomorphously for the aluminum in the fluorophlogopite structure.

8. A substantially crystalline body of synthetic fluorophlogopite consisting essentially of at least about 90% by weight of the fluorophlogopite mica phase, having the general formula $X_{0.5-1}Y_3Z_4O_{10}F_2$, wherein X is at least one singly or doubly charged positive ion having an ionic radius greater than 1.0 selected from the group consisting of $Na^+$, $K^+$, $Rb^+$, $Ag^+$, $Ca^{2+}$, $Sr^{2+}$, $Ba^{2+}$, $Tl^+$, and $Pb^{2+}$, Y is at least one doubly or more highly charged positive ion having an ionic radius between 0.60 and 0.90 selected from the group consisting of $Mg^{2+}$, $Cu^{2+}$, $Zn^{2+}$, $Ti^{4+}$, $Zr^{4+}$, $Sn^{4+}$, $Mo^{6+}$, $Mn^{4+}$, $Co^{2+}$, and $Ni^{2+}$, and Z represents a combination of silicon and a highly charged positive ion having an ionic radius less than 0.6 selected from the group consisting of $Al^{3+}$ and $B^{3+}$ in a mole ratio of 3:1, nucleated with about 0.2–10% by weight chromium oxide such that the fluorophlogopite mica crystals are grown perpendicularly from the surface layer inward.

References Cited in the file of this patent

FOREIGN PATENTS 1,009,135 Germany _____ Feb. 9, 1961

OTHER REFERENCES

Bureau of Mines Report of Investigation, 5,337, "Synthetic Mica," Dept. of Interior, June 1957, pages 35, 59, 60, 73–74.